US010193354B2

(12) United States Patent
Crompton et al.

(10) Patent No.: US 10,193,354 B2
(45) Date of Patent: Jan. 29, 2019

(54) NEAR ZERO VOLT STORAGE TOLERANT ELECTROCHEMICAL CELLS THROUGH REVERSIBLE ION MANAGEMENT

(71) Applicants: Kyle Crompton, Rochester, NY (US); Brian Landi, Rochester, NY (US)

(72) Inventors: Kyle Crompton, Rochester, NY (US); Brian Landi, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 30 days.

(21) Appl. No.: 15/481,115

(22) Filed: Apr. 6, 2017

(65) Prior Publication Data
US 2017/0324255 A1 Nov. 9, 2017

Related U.S. Application Data

(60) Provisional application No. 62/318,930, filed on Apr. 6, 2016.

(51) Int. Cl.
*H02J 7/00* (2006.01)
*H01M 10/0525* (2010.01)
(Continued)

(52) U.S. Cl.
CPC .............. *H02J 7/0008* (2013.01); *H01M 4/94* (2013.01); *H01M 10/058* (2013.01);
(Continued)

(58) Field of Classification Search
CPC .. H02J 7/0008; H02J 7/0081; H01M 10/0525; H01M 4/94; H01M 10/63; H01M 2300/002; H01M 14/00; H01M 2010/4271
(Continued)

(56) References Cited

U.S. PATENT DOCUMENTS 4,517,265 A 5/1985 Belanger et al.
5,053,297 A 10/1991 Yamahira et al.
(Continued)

FOREIGN PATENT DOCUMENTS

| EP | 1577914 A1 | 9/2005 |
|---|---|---|
| WO | 2003044880 A1 | 5/2003 |
| WO | 2015028542 A1 | 3/2015 |

OTHER PUBLICATIONS

Park et al., LiFeO2-incorporated LiMoO3 as a cathode additive for lithium-ion battery safety, Chem. Mater., 2012, 24, 2673-2683.
(Continued)

*Primary Examiner* — M Baye Diao
(74) *Attorney, Agent, or Firm* — Bond, Schoeneck & King, PLLC; Joseph Noto

(57) ABSTRACT

An electrochemical cell having a positive electrode; a negative electrode and an electrolyte, wherein the electrochemical cell contains reversible ions in an amount sufficient to maintain a negative electrode potential verses reference level below a negative electrode damage threshold potential of the cell and a positive electrode potential verses reference level above a positive electrode damage threshold potential of the cell under an applied load at a near zero cell voltage state, such that the cell is capable of recharge from the near zero cell voltage state, and method for its production is disclosed.

20 Claims, 11 Drawing Sheets

(51) Int. Cl.
*H01M 10/0568* (2010.01)
*H01M 10/058* (2010.01)
*H01M 10/42* (2006.01)
*H01M 10/48* (2006.01)
*H01M 10/63* (2014.01)
*H01M 4/94* (2006.01)
*H01M 4/525* (2010.01)
*H01M 4/587* (2010.01)
*H01M 10/054* (2010.01)
*H01M 14/00* (2006.01)

(52) U.S. Cl.
CPC ... *H01M 10/0525* (2013.01); *H01M 10/0568* (2013.01); *H01M 10/42* (2013.01); *H01M 10/48* (2013.01); *H01M 10/63* (2015.04); *H02J 7/0081* (2013.01); *H01M 4/525* (2013.01); *H01M 4/587* (2013.01); *H01M 10/054* (2013.01); *H01M 14/00* (2013.01); *H01M 2010/4271* (2013.01); *H01M 2010/4292* (2013.01); *H01M 2300/002* (2013.01)

(58) Field of Classification Search
USPC .................................................... 320/149
See application file for complete search history.

(56) References Cited

U.S. PATENT DOCUMENTS

| | | |
|---|---|---|
| 5,069,683 A | 12/1991 | Fong et al. |
| 5,436,093 A | 7/1995 | Huang et al. |
| 5,527,640 A * | 6/1996 | Rudge .................. H01G 9/022 429/213 |
| 5,543,021 A | 8/1996 | Yazami et al. |
| 5,595,837 A | 1/1997 | Olsen et al. |
| 5,721,067 A | 2/1998 | Jacobs et al. |
| 5,743,921 A | 4/1998 | Nazri et al. |
| 5,753,388 A | 5/1998 | Koksbang et al. |
| 5,759,715 A | 6/1998 | Barker et al. |
| 6,022,640 A * | 2/2000 | Takada ................. H01M 4/131 429/231.1 |
| 6,120,707 A * | 9/2000 | Shirane ............. H01M 10/0525 252/500 |
| 6,335,115 B1 | 1/2002 | Meissner |
| 6,489,061 B1 | 12/2002 | Hossain |
| 6,553,263 B1 | 4/2003 | Meadows et al. |
| 6,596,439 B1 | 7/2003 | Tsukamoto et al. |
| 6,982,132 B1 * | 1/2006 | Goldner ................... E06B 9/24 204/192.11 |
| 7,101,642 B2 | 9/2006 | Tsukamoto et al. |
| 7,177,691 B2 | 2/2007 | Meadows et al. |
| 7,184,836 B1 | 2/2007 | Meadows et al. |
| 7,248,929 B2 | 7/2007 | Meadows et al. |
| 7,295,878 B1 | 11/2007 | Meadows et al. |
| 7,337,010 B2 | 2/2008 | Howard et al. |
| 7,563,541 B2 | 7/2009 | Howard et al. |
| 7,648,801 B2 * | 1/2010 | Dahn ................... H01M 4/131 252/62.2 |
| 7,740,985 B2 | 6/2010 | Howard et al. |
| 7,807,299 B2 | 10/2010 | Howard et al. |
| 7,818,068 B2 | 10/2010 | Meadows et al. |
| 7,879,495 B2 | 2/2011 | Howard et al. |
| 7,927,742 B2 | 4/2011 | Scott et al. |
| 7,931,987 B2 | 4/2011 | Howard et al. |
| 7,993,781 B2 | 8/2011 | Tsukamoto et al. |
| 8,158,282 B2 | 4/2012 | Zhamu et al. |
| 8,178,242 B2 | 5/2012 | Howard et al. |
| 8,192,872 B2 | 6/2012 | Kim et al. |
| 8,372,543 B2 | 2/2013 | Kim et al. |
| 8,383,269 B2 | 2/2013 | Scott et al. |
| 8,535,831 B2 | 9/2013 | Tsukamoto et al. |
| 8,637,184 B2 | 1/2014 | Tsukamoto et al. |
| 8,835,055 B2 | 9/2014 | Chang et al. |
| 8,999,584 B2 | 4/2015 | Jiang et al. |
| 9,023,525 B2 | 5/2015 | Chang et al. |
| 9,236,610 B2 | 1/2016 | Chang et al. |
| 10,008,742 B2 * | 6/2018 | Holme ............. H01M 10/0562 |
| 2003/0000074 A1 | 1/2003 | Tsukamoto et al. |
| 2003/0025482 A1 | 2/2003 | Tsukamoto et al. |
| 2003/0191504 A1 | 10/2003 | Meadows et al. |
| 2003/0195581 A1 | 10/2003 | Meadows et al. |
| 2006/0093873 A1 | 5/2006 | Howard et al. |
| 2006/0093916 A1 | 5/2006 | Howard et al. |
| 2006/0093917 A1 | 5/2006 | Howard et al. |
| 2006/0095094 A1 | 5/2006 | Howard et al. |
| 2006/0147803 A1 | 7/2006 | Kim et al. |
| 2006/0251968 A1 | 11/2006 | Tsukamoto et al. |
| 2007/0185551 A1 | 8/2007 | Meadows et al. |
| 2008/0274408 A1 | 11/2008 | Jarvis |
| 2009/0035662 A1 | 2/2009 | Scott et al. |
| 2009/0035663 A1 | 2/2009 | Yakovleva et al. |
| 2009/0169998 A1 | 7/2009 | Tsukamoto et al. |
| 2009/0208845 A1 | 8/2009 | Howard et al. |
| 2010/0120179 A1 | 5/2010 | Zhamu et al. |
| 2010/0203386 A1 | 8/2010 | Chang et al. |
| 2010/0239908 A1 | 9/2010 | Howard et al. |
| 2011/0135810 A1 | 6/2011 | Yakovleva et al. |
| 2011/0183210 A1 | 7/2011 | Howard et al. |
| 2011/0226987 A1 | 9/2011 | Yakovleva et al. |
| 2011/0244324 A1 | 10/2011 | Jang et al. |
| 2011/0278161 A1 | 11/2011 | Choi et al. |
| 2011/0281148 A1 | 11/2011 | Scott et al. |
| 2012/0003531 A1 | 1/2012 | Howard et al. |
| 2012/0214058 A1 | 8/2012 | Kim et al. |
| 2012/0247963 A1 | 10/2012 | Utsunomiya et al. |
| 2012/0300366 A1 | 11/2012 | Cho et al. |
| 2013/0003261 A1 | 1/2013 | Remizov et al. |
| 2013/0011727 A1 | 1/2013 | Chang et al. |
| 2013/0164584 A1 | 6/2013 | Scott et al. |
| 2013/0194721 A1 | 8/2013 | Cho et al. |
| 2014/0227432 A1 | 8/2014 | Liu et al. |
| 2014/0272584 A1 | 9/2014 | Jiang et al. |
| 2014/0310951 A1 | 10/2014 | Grant et al. |
| 2014/0315078 A1 | 10/2014 | Chang et al. |
| 2015/0010696 A1 | 1/2015 | Yakovleva et al. |
| 2015/0132641 A1 | 5/2015 | Yakovleva et al. |
| 2016/0285125 A1 * | 9/2016 | Harrup ............. H01M 10/0563 |

OTHER PUBLICATIONS

Lee et al., Li2NiO2 as a novel cathode additive for overdischarge protection of li-ion batteries, Chem. Mater., 2008, 20, 5-7.

Dahn et al., Rechargeable LiNiO2/carbon cells, J. Electrochem. Soc., 1991, 138, 2207-2211.

Hossain et al., Comparative studies of aMCBC and C-C composite as anodes for lithium-ion battery systems, J. Power Sources, 2003, 114, 264-276.

Hossain et al., Carbon-carbon composite anodes for lithium-ion battery systems, J. Power Sources, 2001, 96, 5-13.

Kim et al., Succinonitrile as a corrosion inhibitor of copper current collectors for overdischarge protection of lithium ion batteries, ACS Appl. Mater. Interfaces, 2014, 6, 2039-2043.

Li et al., Effect of overdischarge on swelling and recharge performance of lithium ion cells, Chinese J. Chem., 2008, 26, 1585-1588.

Jarvis et al., A prelithiated carbon anode for lithium-ion battery applications, J. Power Sources, 2006, 162, 800-802.

Kim et al., A fast and efficient pre-doping approach to high energy density lithium-ion hybrid capacitors, J. Mater. Chem. A, 2014, 2, 10029.

Li et al., Effective enhancement of lithium-ion battery performance using SLMP, Electrochemistry Communications, 2011, 13, 664-667.

Liu et al., Prelithiated silicon nanowires as an anode for lithium batteries, ASC Nano., doi: 10.1021/nn2017167.

Sivakkumar et al. Evaluation of lithium-on capacitors assembled with pre-lithiated graphite anode and activated carbon cathode, Electrochimica Acta, 2012, 65, 280-287.

Wang et al. SBR-PVDF based binder for the application of SLMP in graphite anodes, RSC Advances, 2013, 3, 15022.

(56) References Cited

OTHER PUBLICATIONS

Wang et al., Application of stabilized lithium metal powder (SLMP) in graphite anode—A high efficient prelithiation method for lithium-ion batteries, J. Power Sources, 2014, 260, 57-61.
Forney et al., Prelithiation of silicon-carbon nanotube anodes for lithium ion batteries by stabilized lithium metal powder, Nano Lett. 2013, 13, 4158-4163.
Arora, Capacity fade mechanisms and side-reactions in lithium ion batteries, J. Electrochem. Soc., 1998, 145, 10, 3647-3667.
Zhao et al., Electrochemical stability of copper in lithium-ion battery electrolytes, J. Electrochem. Soc. 147, 8, 2874-2879.
Turnblom, Near zero volt storage tolerant lithium cells, Go/GoNo Assessment Report, Jan. 30, 2017, Foresight Science and Technology, Hopkinton, MA, USA.
Lee et al., Interim research report for: RIT battery group, Technology Commercialization Law Program at Syracuse University, Summer 2016, Syracuse University College of Law, Syracuse, NY, USA.
Wood et al., Prospects for reducing the processing cost of lithium ion batteries, J. Power Sources, 2015, 234-242.
Endo et al., Recent development of carbon materials for Li ion batteries, Carbon N. Y., 2000, 38, 183-197.
Dahn, Lithium-ion batteries, in Handbook of Batteries, 3rd ed., Eds. Linden and Reddy, 2002, McGraw-Hill Companies, Inc., New York, NY, USA.
Stura et al., New nanomaterials for light weight lithium batteries, Anal. Chim. Acta, 2006, 568, 57-64.
Erickson et al., New Horizons for Conventional Lithium Ion Battery Technology, J. Phys. Chem. Lett., 2014, 3313-3324.
Kim et al., A three-dimensional thermal abuse model for lithium-ion cells, J. Power Sources, 2007, 170, 476-489.
Chen et al., Thermal Analysis of Lithium-Ion Batteries., J. Electrochem. Soc. 1996, 143, 2708-2712.
Mills et al., Simulation of passive thermal management system for lithium-ion battery packs., J. Power Sources, 1999, 83, 1-8.
Spotnitz et al., Abuse behavior of high-power, lithium-ion cells, J. Power Sources, 2003, 113, 81-100.
Bandhauer et al., A Critical Review of Thermal Issues in Lithium-Ion Batteries, J. Electrochem. Soc., 2011, 158, R1-R25.
Maleki et al., Thermal Stability Studies of Li-Ion Cells and Components, J. Electrochem. Soc. 1999, 146, 3224-3229.
Zavalis et al., Investigation of short-circuit scenarios in a lithium-ion battery cell, J. Electrochem Soc., 2012, 159, A848.
Reichert et al., Lithium-Ion Cell Nail Penetration Safety Experiments under Adiabatic Conditions, ECS Trans., 2014, 61, 87-103.
Golubkov et al., Thermal runaway of commercial 18650 Li-ion batteries with LFP and NCA cathodes—impact of state of charge and overcharge, RSC Adv., 2015, 5, 57171-57186.
Mendoza-Hernandez et al., Cathode material comparison of thermal runaway behavior of Li-ion cells at different state of charges including over charge. J. Power Sources, 2015, 280, 499-504.
Hammami et al., Lithium-ion batteries: runaway risk of forming toxic compounds.Nature, 2003, 424, 635-636.
Yang et al., Investigations of the exothermic reactions of natural graphite anode for Li-ion batteries during thermal runaway, J. Electrochem. Soc., 2005, 152, A73-A79.
Wang et al., Thermal runaway caused fire and explosion of lithium ion battery, J. Power Sources, 2012, 208, 210-224.
Lamb et al., Failure propagation in multi-cell lithium ion batteries, J. Power Sources, 2014, 283, 517-523.
Ping et al., Study of the fire behavior of high-energy lithium-ion batteries with full-scale burning test, J. Power Sources, 2015, 285, 80-89.
Doughty et al., A general discussion of Li-ion battery safety., Electrochem. Soc. Interface, 2012, 37-44.
Balakrishnan et al., Safety mechanisms in lithium-ion batteries, J. Power Sources, 2006, 155, 401-414.
Lee et al., A review of recent developments in membrane separators for rechargeable lithium-ion batteries, Energy Environ. Sci. 2014, 7, 3857-3886.
Lin et al., Investigation on suppressed thermal runaway of Li-ion battery by hyper-branched polymer coated on cathode, Electrochim. Acta, 2013, 101, 11-17.
Cho et al., Comparison of Al2O3- and AlPO4-coated LiCoO2 cathode materials for a Li-ion cell, J. Power Sources, 2005, 146, 58-64.
Cho, Dependence of AlPO4 coating thickness on overcharge behaviour of LiCoO2 cathode material at 1 and 2 C rates, J. Power Sources, 2004, 126, 186-189.
Cho, Correlation between AlPO4 nanoparticle coating thickness on LiCoO2 cathode and thermal stability, Electrochim. Acta, 2003, 48, 2807-2811.
Shi et al., Improved electrochemical performance of AlPO4-coated LiMn1.5Ni0.5O4 electrode for lithium-ion batteries, J. Power Sources, 2010, 195, 6860-6866.
Nagasubramanian et al., Reducing Li-ion safety hazards through use of non-flammable solvents and recent work at Sandia National Laboratories, Electrochim. Acta, 2013, 101, 3-10.
Xu et al., An Attempt to Formulate Nonflammable Lithium Ion Electrolytes with Alkyl Phosphates and Phosphazenes, J. Electrochem. Soc., 2002, 149, A622.
Kishiyama et al., Improvement of Deep. Discharge Capability for Lithium Ion Batteries, Abs. 425, 204th Meeting, The Electrochemical Society, Inc., 2003.
Huggins, Advanced Batteries: Materials Science Aspect, 2009, Springer US.
PCT International Search Report, Form PCT/ISA/210, International application No. PCT/US16/68192, International filing date Apr. 6, 2017, dated Jun. 1, 2017.
Xu et al., Nonflammable Electrolytes for Li-Ion Batteries Based on a Fluorinated Phosphate, J. Electrochem. Soc., 2002, 149, A1079.
Otsuki et al., Flame-Retardant Additives for Lithium-Ion Batteries, Lithium-Ion Batter. Sci. Technol., 2009, 121, 275-289.
Ota et al., Effect of cyclic phosphate additive in non-flammable electrolyte, J. Power Sources, 2003, 119-121, 393-398.
Arai, A novel non-flammable electrolyte containing methyl nonafluorobutyl ether for lithium secondary batteries, J. Appl. Electrochem. 2002, 32, 1071-1079.
Wang et al., Nonflammable Trimethyl Phosphate Solvent-Containing Electrolytes for Lithium-Ion Batteries: II. The Use of an Amorphous Carbon Anode, J. Electrochem. Soc., 2001, 148, A1066.
Ding et al., Effects of Tris(2,2,2-trifluoroethyl) Phosphate as a Flame-Retarding Cosolvent on Physicochemical Properties of Electrolytes of LiPF6 in EC-PC-EMC of 3:3:4 Weight Ratios, J. Electrochem. Soc., 2002, 149, A1489.
Dahn et al., High-Rate Overcharge Protection of LifePo 4- Based Li-Ion Cells Using the Redox Shuttle Additive 2,5-Ditertbutyl-1, 4-dimethoxybenzene, J. Electrochem. Soc., 2005, 152, A1283.
Golovin, Applications of Metallocenes in Rechargeable Lithium Batteries for Overcharge Protection, J. Electrochem. Soc., 1992, 139, 5.
Chen et al., Chemical overcharge and overdischarge protection for lithium-ion batteries, Electrochem. Solid-State Lett., 2005, 8, A59-A62.
Richardson, Overcharge Protection for Rechargeable Lithium Polymer Electrolyte Batteries, J. Electrochem. Soc., 1996, 143, 3992.
Narayanan et al., Analysis of redox additive-based overcharge protection for rechargeable lithium batteries, 1991, 138, 8, 2224-2229.
Buhrmester et al., Studies of Aromatic Redox Shuttle Additives for LifePo 4-Based Li-Ion Cells, J. Electrochem. Soc., 2005, 152, A2390.
Adachi, Aromatic Compounds as Redox Shuttle Additives for 4 V Class Secondary Lithium Batteries, J. Electrochem. Soc., 1999, 146, 1256.
Buhrmester et al., Phemothiazine Molecules-Possible Redox Shuttle Additives for Chemical Overcharge and Overdischarge Protection for Lithium-Ion Batteries, J. Electrochem. Soc., 2006, 153, A288.
Zhang et al., Capacity fading mechanism during long-term cycling of over-discharged LiCoO2/mesocarbon microbeads battery, J. Power Sources, 2015, 293, 1006-1015.
Maleki et al., Effects of overdischarge on performance and thermal stability of a Li-ion cell, J. Power Sources, 2006, 160, 1395-1402.

(56) References Cited

OTHER PUBLICATIONS

Liu et al., Failure study of commercial LiFePO4 cells in over-discharge conditions using electrochemical impedance spectroscopy, J. Electrochem. Soc., 2014, 161, A260-A632.

Erol et al., Influence of overcharge and over-discharge on the impedance response of LiCoO2|C batteries, J. Power Sources, 2014, 270, 92-100.

Schmidt et al., A novel and fast method of characterizing the self-discharge behavior of lithium-ion cells using a pulse-measurement technique, J. Power Sources, 2015, 274, 1231-1238.

Levi et al., Self-Discharge of Graphite Electrodes at Elevated Temperatures Studied by CV and Electrochemical Impedance Spectroscopy, J. Electrochem. Soc., 2004, 151, A781.

Markevich et al., New Insight into Studies of the Cycling Performance of Li-Graphite Electrodes A Combination of Cyclic Voltammetry, Electrochemical Impedance, and Differential Self-Discharge Measurements, J. Electrochem. Soc., 2005, 152, A778.

Yazami et al., Mechanism of self-discharge in graphite-lithium anode, Electrochim. Acta, 2002, 47, 1217-1223.

Wang et al., Graphene-coated plastic film as current collector for lithium/sulfur batteries, J. Power Sources, 2013, 239, 572-583.

Sarasketa-Zabala et al., Calendar ageing analysis of a LiFePO4/ graphite cell with dynamic model validations: Towards realistic lifetime predictions, J. Power Sources, 2014, 272, 45-57.

Wang et al., Degradation of lithium ion batteries employing graphite negatives and nickel—cobalt—manganese oxide + spinel manganese oxide positives: Part 1, aging mechanisms and life estimation, J. Power Sources, 2014, 269, 937-948.

Käbitz et al., : Cycle and calendar life study of a graphite |LiNi1/3Mn1/3Co1/3O2 Li-ion high energy system. Part A: Full cell Characterization, J. Power Sources, 2013, 239, 572-583.

Pistoia et al., Storage characteristics of cathodes for Li-ion batteries, Electrochim. Acta, 1996, 41, 2683-2689.

Choi et al., Self-discharge analysis of LiCoO2 for lithium batteries, J. Power Sources, 2004, 138, 283-287.

Blyr et al., Self-Discharge of LiMn2O4/C Li-ion cells in their discharged state, Understanding by means of three-electrode measurements, J. Electrochem. Soc., 1998, 145.

Utsunomiya et al., Self-discharge behavior and its temperature dependence of carbon electrodes in lithium-ion batteries, J. Power Sources, 2011, 196, 8598-8603.

Yazami et al., A kinetics study of self-discharge of spinel electrodes in Li/LixMn2O4 cells, J. Power Sources, 2006, 153, 251-257.

Myung et al., Electrochemical behavior of current collectors for lithium batteries in non-aqueous alkyl carbonate solution and surface analysis by ToF-SIMS, Electrochim. Acta, 2009, 55, 288-297.

Myung et al., Electrochemical behavior and passivation of current collectors in lithium-ion batteries, J. Mater. Chem., 2011, 21, 9891.

Zhang et al., Corrosion of Aluminum Current Collectors in Lithium-Ion Batteries with Electrolytes Containing LiPF6, J. Electrochem. Soc., 2005, 152, B448-B454.

Braithwaite, Corrosion of Lithium-Ion Battery Current Collectors, J. Electrochem. Soc., 1999, 146, 448.

Chen et al., Electrochemical performances of Al-based composites as anode materials for Li-ion batteries, Electrochim. Acta, 2009, 54, 4118-4122.

Hamon et al., Aluminum negative electrode in lithium ion batteries, Science, 2001, 98, 185-187.

Jeong et al., Particulate-reinforced Al-based composite material for anode in lithium secondary batteries, J. Power Sources, 2001, 101, 201-205.

Kuksenko, Aluminum foil as anode material of lithium-ion batteries: Effect of electrolyte compositions on cycling parameters, Russ. J. Electrochem., 2013, 49, 67-75.

Lindsay et al., Al-based anode materials for Li-ion batteries, J. Power Sources, 2003, 119-121, 84-87.

Tsukamoto, Quallion Technology, NASA Aerospace Battery Workshop, 2005.

Landi et al., Carbon nanotubes for lithium ion batteries, Energy Environ. Sci., 2009, 2, 638-654.

Landi et al., Lithium Ion Capacity of Single Wall Carbon Nanotube Paper Electrodes, J. Phys. Chem. C, 2008, 112, 7509-7515.

Kim et al., Effects of succinonitrile (SN) as an electrolyte additive on the impedance of LiCoO2/graphite pouch cells during cycling, J. Electrochem. Soc., 2014, 161, A506-A512.

Thackery, Structural Considerations of Layered and Spinel Lithiated Oxides for Lithium Ion Batteries, J. Electrochem. Soc., 1995, 142, 2558-2563.

Kim et al., Air stable Al2O3-coated Li2NiO2 cathode additive as a surplus current consumer in a Li-ion cell, J. Mater. Chem, 2008, 18, 5880.

Park et al., Li2NiO2 as a sacrificing positive additive for lithium-ion batteries, Electrochim. Acta, 2013, 108, 591-595.

Back et al., Electrochemical Properties and Gas Evolution Behavior of Overlithiated Li2NiO2 as Cathode Active Mass or Rechargeable Li Ion Batteries., Electrochem. Soc., 2012, 159, A887.

Noh et al., Role of Li6CoO4 cathode additive in Li-ion cells containing low coulombic efficiency anode material, J. Electrochem. Soc., 2012, 159, A1329-A1334.

Sun et al., High-capacity battery cathode prelithiation to offset initial lithium loss, Nat. Energy, 2016, 1, 15008.

\* cited by examiner

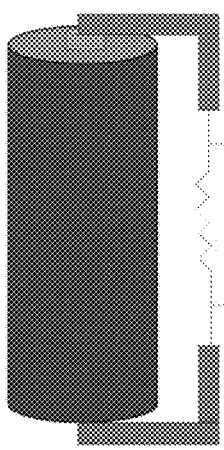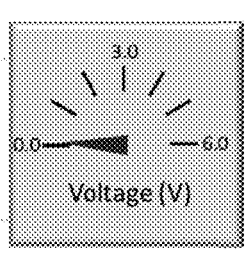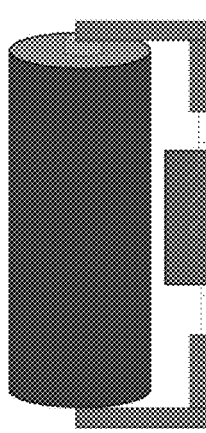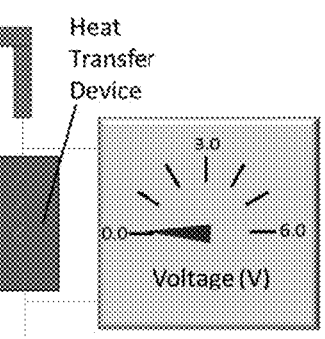
FIG. 10A  FIG. 10B

NEAR ZERO VOLT STORAGE TOLERANT ELECTROCHEMICAL CELLS THROUGH REVERSIBLE ION MANAGEMENT

CROSS REFERENCE

This application claims the benefit of the filing date of U.S. Provisional Patent Application Ser. No. 62/318,930, filed Apr. 6, 2016, which is hereby incorporated by reference in its entirety.

This disclosure was made with government support under grant number FA9453-14-1-0239 awarded by AFRL. The government has certain rights in this disclosure.

FIELD

This disclosure relates to near zero volt storage tolerant electrochemical cells, and in particular to rechargeable near zero volt storage tolerant electrochemical cells.

BACKGROUND

Lithium ion batteries are being used for mobile grid deployments in cases of natural events (emergencies) and there could be cases where driving long distances in a near zero volt condition would significantly reduce the risk of serious event during an accident.

In addition to safe transport and storage of lithium ion batteries, several other potential benefits exist for cells that can be discharged to and stored at a near zero volt state of charge. For one, a cell would be, by extension, more tolerant to over-discharge during operation that can occur due to mismanagement of a battery system. Individual cells or batteries could also be stored for long periods without regular checking of the open circuit voltage or having to apply trickle charging. This is especially useful for batteries that are difficult to access such as those in implanted medical devices or those used in satellites.

In the case of emergency, it would be useful to have lithium ion cells that could be completely discharged to a near zero volt state of charge with only a resistor and no sophisticated discharging equipment. The cells could then be recovered and used again at a later time. This could be very useful in home energy storage (like a Tesla Powerwall), where a fire alarm could trigger a fixed load to be applied to all cells in a battery and discharge them to a near zero volt state of charge. As long as all cells are completely discharged before a house fire reaches the battery, it is much less likely to go into thermal runaway upon overheating. This would reduce further damage to a home and make the fire much more manageable for emergency crews. The same is true for an electric vehicle in an accident. An accident could trigger an appropriately sized resistor bank/radiator to discharge the cells in the battery to a near zero volt state of charge. Such a battery would reduce risk to vehicle passengers and make handling of the wreckage by emergency crews much safer. In both cases, the battery could then be recovered and re-used if un-damaged by the event or there was a false alarm. This would prevent a substantial loss of assets (given that the cost of the battery is currently 400-600 $/kWh) and reduce the environmental impact of lithium ion battery waste.

Shipping and transportation entities could benefit from a scenario where the safety risks are better controlled prior to shipment. A cell is desired that is stored with a resistor between its leads will be at or near zero volts, and its state of charge can be easily checked by a hand-held volt meter to ensure it is fully discharged. This enables more layers of checks to ensure that lithium ion cells are at a safe state of charge before they are transported, stored, etc. In comparison, voltage checks of batteries may not accurately reflect the true state of charge (SOC) which carries different risk since the actual SOC directly correlates with the exothermic energy that can be released upon abuse. Specifically, the Open Circuit Voltage (OCV) of a cell can vary for a given state of charge during storage, making it an unreliable indicator of the state of charge of a cell; as well as be sensitive to the length of time in open circuit and the environmental conditions such as temperature. The challenge of correlating the OCV with SOC is even more difficult in cells using positive electrode materials that have a nearly constant discharge voltage, such as $LiFePO_4$. To be sure of the state of charge, sophisticated charging equipment and a large amount of time are required, which renders such an approach not viable for shipping organizations like UPS, USPS, and FEDEX.

As society transitions to renewable energy sources and expanded use of electrical energy, energy storage in a reliable and safe manner is becoming ever more paramount. For many portable applications electrochemical energy storage using lithium ion batteries is currently the premier method due to the enhanced rechargeable chemistry. Compared to other designs (i.e., NiCd, Ni—H, etc.) lithium ion has higher energy density, cycle life and highly tunable performance characteristics. There are many efforts underway to enhance lithium ion battery performance to align with future application needs, however, as energy density increases, the safety risks also increase.

When in a user-active state, manufacturer defect or abuse of lithium ion cells within a battery can lead to a thermal runaway event. Thermal runaway results from several internal exothermic reactions that are initiated by overheating of a cell by internal short, rapid discharge, external heating or other abuse condition. The exothermic reactions include SEI decomposition, electrolyte reaction with the electrodes, decomposition of active materials and electrolyte decomposition. Thermal runaway can result in a dangerous fire or explosion that can propagate to other nearby cells. In the case of a large battery consisting of many lithium ion cells or many batteries stored together, this can lead to a very dangerous event with severe damage including explosion, fire, and venting of toxic gases. Several research efforts to mitigate safety risks while lithium ion batteries are in a user-active state have been reported. Efforts internal to the lithium ion cells such as shut-down separators to prevent current flow upon overheating, positive electrode coatings to suppress exothermic release, non-flammable electrolytes to avoid electrolyte combustion and redox shuttle additives to prevent overcharge have been investigated. Efforts external to cells such as Positive Temperature Coefficient devices (PTC) to block or reduce current upon overheating, battery management systems (BMS) to avoid abuse of cells, Current Interrupt Device (CID) to block current in the case of over-pressure, current limiting fuses to prevent rapid charge or discharge, blocking diodes to prevent inadvertent charge or discharge, and bypass diodes to prevent overcharge/overdischarge of a "weak" cell in a battery pack have all been investigated or are currently used.

In the case of a user-inactive state, it would be ideal for the individual cells (and therefore the whole battery) of a lithium ion battery to store no charge energy and be at a zero volt state of charge since the battery does not need stored energy to perform a task. This would minimize the amount of energy that could be released in a catastrophic event, reducing safety risks associated with the inactive battery. Discharging cells only to their normal end-of-discharge cutoff voltage (still some charge remaining) has been shown to prevent thermal runaway under physical abuse conditions (i.e., nail penetration) and lead to higher onset temperatures of thermal runaway/exothermic reactions upon overheating. As such, discharging cells to a very low state of charge before storage and shipping could greatly reduce the safety risks associated with them in an inactive state.

However, discharging conventional lithium ion cells to very low states of charge, especially to near zero volts, risks damaging internal components of the cells (most significantly dissolution of the copper current collector of the negative electrode.). Even if cells are not intentionally discharged to very low states of charge, gradual self-discharge can, over time, bring the cell voltages to damaging low levels. As such, cells are currently shipped and stored in a partially charged state to mitigate the chance of self-discharge bringing the cell voltage too low. In this partially charged state, the energy stored can present a safety risk.

If lithium ion cells could be modified in such a way that discharge to low voltages did not damage internal components, they could be discharged to very low states of charge prior to shipping and storage without concern for performance degradation. As discussed above, this could substantially reduce safety concerns with the cells when in an inactive state.

While this is a promising approach from a safety standpoint, in order for it to be implementable it also needs to be highly controllable in order to comply with regulations. A cell stored at open-circuit, even in a low state of charge, will have an open-circuit voltage that can vary depending on ambient conditions, history of the cell and the active materials used in the cell. As such, checking the open circuit voltage of a cell with a volt meter is insufficient for definitively determining the state of charge of the cell. Instead, sophisticated charging equipment and significant amounts of time would be required. As a result, shipping and storage entities would be unable to rapidly assess the state of charge of a cell on their own and would likely have to rely on manufacturers to ensure that cells are in a specified low state of charge prior to shipment/storage. This could lead to errors that result in unintentional safety risk from cells in a high state of charge.

In an alternative scenario, an appropriately sized resistor (i.e., won't discharge the cell at too high of a rate) could be applied to a cell that is ideally already in a low state of charge. Once applied, it would effectively completely discharge the cell, bringing the cell voltage to near zero volts and maintaining it there as long as the resistor stays applied to the cell. This state could easily be checked with a handheld voltmeter because regardless of ambient conditions, cell history, or active materials used the cell voltage will be at near zero volts. This will enable the state of charge of the cells to be easily checked at multiple stages of transit and storage, adding significant controllability to ensuring a safe state of charge of the cell.

Enabling lithium ion cells to an applied resistor at near zero volts without damaging internal components could present a highly controllable way to effectively mitigate the safety risks associated with storing and transporting them, especially when in large battery packs and/or large cell formats. This could lead to greatly reduced restrictions on their storage and transportation, which would reduce costs and increase the distribution network of lithium ion batteries. Additional safety capabilities such as this could also help to assuage public concerns over the safety of lithium ion batteries, especially in emerging home and electric vehicle applications. The key with such a promising approach is to accomplish tolerance to near zero volt storage with little to no modification to a conventional lithium ion cell design; which would be a stark contrast to past approaches that require modifications to cell design and use of unconventional materials that can reduce cell quality and performance.

One strategy to avoid copper dissolution during zero volt storage has been to employ alternative negative electrode current collectors which do not undergo dissolution at higher potentials vs. Li/Li+. Voltammetry studies have been done previously on potential current collector replacement materials to determine the stability of the material at high potentials vs. Li/Li+ (i.e., >3V) as well as low potentials vs. Li/Li+ (i.e., 5-1000 mV), which is a requirement for negative electrode current collectors. Some metals, like aluminum, will alloy with lithium at low potentials in conventional $LiPF_6$-based electrolytes which leads to negative electrode pulverization during normal cycling in this voltage range. Titanium, titanium alloys, nickel, nickel alloys and stainless steel have all been patented as potential candidates because they meet the high and low voltage stability requirements.

Titanium foils are showing promise in commercially developed zero volt storage capable cells as a negative electrode current collector. However, some drawbacks exist with typical titanium foils in that they are typically thicker than standard copper foils and can cost substantially more. This can substantially reduce both the volumetric and gravimetric energy density of the cells while increasing cost. Additionally, bulk titanium is more than an order of magnitude more resistive than copper, which has been stated to limit the rate capability of cells, especially in larger format or wound cells.

Carbon nanotube and graphene free-standing electrodes may also be potential current collector replacements due to their high chemical stability. Negative electrodes made purely of other carbon allotropes have already been demonstrated to generate cells that can tolerate constant-load near-zero-volt and overdischarge conditions. However, lower bulk electrical conductivity, coulombic efficiency issues from S E I (SEI) formation on nanoscale surface, and higher cost are disadvantages of the nanocarbon-based current collectors compared to copper.

In addition to utilizing replacement current collector materials for copper, another strategy to protect cells during overdischarge conditions is to passivate copper current collectors and prevent dissolution at high potentials vs. Li/Li+. One approach is the use of succinonitrile as an electrolyte additive to passivate the copper current collector and prevent its corrosion. However, succinonitrile has also been shown to significantly increase the impedance of the positive electrode during cycling. Formation of nitrile compounds on the surface of copper foil before electrode fabrication has also shown promise, but it is unclear what effect this might have on the charge transfer resistance between the copper current collector and negative electrode composite.

Another past approach to zero volt storage tolerance of lithium ion cells has been to appropriately modify the cell with secondary active materials in either the positive electrode, negative electrode or both that have charge and discharge characteristics to prevent high negative electrode potential vs. Li/Li+ during overdischarge or near zero volt storage. No widely available validation or experimental data exists on many of the patented secondary active materials.

Thus, the resilience to multi-day near zero volt storage and impact on performance during normal operation is unclear.

Overall, use of secondary active materials in the electrodes has major potential drawbacks. Namely, any approach that adds significant amounts of secondary active materials with intermediate charge/discharge potentials will likely decrease cell energy density by lowering the average discharge voltage and/or electrode specific capacity. Concerns for differing rate capability effects between primary and secondary materials could limit this approach. Additionally, many operational concerns exist over the stability of secondary active materials in the potential range of the primary active materials as well as the repeated cycling behavior is unknown.

SUMMARY

In accordance with one aspect of the present disclosure, there is provided an electrochemical cell, having a positive electrode; a negative electrode; and an electrolyte, wherein the electrochemical cell contains reversible ions in a specific amount to maintain a negative electrode potential verses reference level below a negative electrode damage threshold potential of the cell and a positive electrode potential verses reference level above a positive electrode damage threshold potential of the cell under an applied load at a near zero cell voltage state, such that the cell is capable of recharge from the near zero cell voltage state.

In accordance with another aspect of the present disclosure, there is provided a method for providing an electrochemical cell which manages an amount of reversible ions that enables a near zero voltage storage for prolonged periods of time under an applied load capable of recharge without significant degradation of discharge performance, including: a) measuring the electrochemical potential of a negative electrode vs. reference level and a positive electrode vs. reference level upon application of an applied load to a first electrochemical cell as the cell reaches a near zero volt cell voltage; b) determining the EAP from the measured electrochemical potential of the negative electrode vs. reference level and the positive electrode vs. reference level; c) adjusting the amount of reversible ions in a second electrochemical cell based upon the determined EAP from the first electrochemical cell, wherein the first and second cells can be the same or different; and d) repeat steps a), b) and c) until an amount of the reversible ions in the cell is identified that achieves the negative electrode potential verses reference level below a negative electrode damage threshold potential of the cell and the positive electrode potential verses reference level above a positive electrode damage threshold potential of the cell under the applied load at a near zero cell voltage state.

These and other aspects of the present disclosure will become apparent upon a review of the following detailed description and the claims appended thereto.

BRIEF DESCRIPTION OF THE DRAWINGS

FIG. 10A is an illustration of a resistive load clip and analog voltmeter and FIG. 10B is an illustration of a resistive load clip and analog voltmeter with a heat transfer device.

DETAILED DESCRIPTION

Figure 1A:
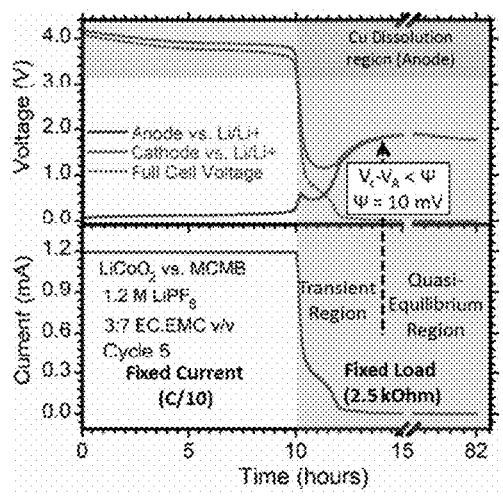
FIG. 1A is a graph of cycle discharge, fixed load step cell voltage and electrode potentials plotted vs. time of a Reversible Lithium Excess (RLE) cell

An embodiment includes an electrochemical cell, having a positive electrode; negative electrode; separator material, and electrolyte, wherein the electrochemical cell contains reversible ions in an amount sufficient to maintain a negative electrode potential verses reference level below a negative electrode damage threshold potential and a positive electrode potential verses reference level above a positive electrode damage threshold potential of the cell under an applied load at a near zero cell voltage state, such that the cell is capable of recharge from the near zero cell voltage state.

An amount of reversible ions is defined as the total amount of ions reversibly inserted into both the positive and negative electrodes of a cell. These reversible ions are solvated in the electrolyte solution and are the majority charge carriers of the electrolyte. The damage threshold potential of the negative electrode is defined as the potential at which substrate dissolution, dissolution of passivation films, dissolution of active materials or side reactions with the electrolyte can occur. The damage threshold potential of the positive electrode is defined as the potential at which material transformation, substrate transformation or side reactions with the electrolyte can occur. A suitable near zero cell voltage state includes a measured voltage magnitude less than about 2V, less than about 1 V, less than about 500 mV, less than about 100 mV, or less than about 10 mV.

Suitable types of applied loads include but are not limited to a fixed resistive load, fixed capacitive load, fixed inductive load, variable resistive load, variable capacitive load, variable inductive load, or a combination thereof. Load values may be as high as open circuit (infinity) or as low as 0.00 ohms (short circuit). Time under load prior to recharge is typically >about 5 hours. The positive electrode inserts and extracts ions at a potential verses reference level that is more positive than the potential verses reference level than the negative electrode inserts and extracts ions. The Electrode Asymptotic Potential (EAP) is defined by equation 1 where $V_C$ is the positive electrode electrochemical potential vs. reference level, e.g., positive electrochemical potential vs. Li/Li$^+$, $V_A$ is the negative electrode electrochemical potential vs. reference level, e.g., negative electrochemical potential vs. Li/Li$^+$, and $\Psi$ is the threshold difference between the electrode electrochemical potentials chosen to define the EAP and is the potential half-way between the negative electrode potential and positive electrode potential when the electrochemical cell reaches a quasi-equilibrium, near zero volt state. $\Psi$ is chosen such that the EAP is representative of the electrochemical potentials of both electrodes versus reference level when the electrochemical cell is in a near zero volt, quasi-equilibrium state.

$$EAP = \frac{V_C - V_A}{2} + V_A \text{ when } V_C - V_A < \Psi \quad (1)$$

An embodiment includes a method for providing an electrochemical cell which manages an amount of reversible ions that enables a near zero volt storage for prolonged periods of time under an applied load capable of recharge without significant degradation of discharge performance.

The method includes measuring the electrochemical potential of a negative electrode vs. reference level and a positive electrode vs. reference level upon application of an applied load to a first electrochemical cell as the cell reaches a near zero volt cell voltage. This can be done by constructing an electrochemical cell using desired positive and negative electrode materials and a third reference electrode. Optionally, the cell can be conditioned by charging and discharging the cell one or more times to stabilize the charge and discharge performance. From a fully or partially charged state a desired load is applied to the cell to discharge to a near zero volt state and the potentials of the positive and negative electrode vs the reference electrode are measured throughout discharge. FIG. 1A shows an example of the measured transient behavior of the electrode potentials as a lithium ion cell discharges to near zero volts under a fixed resistive load. In FIG. 1A the 5th cycle discharge and fixed load step (grey shading) cell voltage and electrode potentials are plotted vs. time of a RLE cell. The slightly darker grey shading represents negative electrode potential range in which copper dissolution occurs.

The EAP is determined from the measured electrochemical potential of the negative electrode vs. reference level and the positive electrode vs. reference level.

The amount of reversible ions is adjusted in an electrochemical cell based upon the determined EAP from the initial electrochemical cell. These cells can be the same or different depending upon the extent of destruction of the cell during testing and the selected cell construction.

The steps of measuring the electrochemical potential of a negative electrode vs. reference level and a positive electrode vs. reference level upon application of an applied load to a first electrochemical cell as the cell reaches a near zero volt cell voltage; determining the EAP from the measured electrochemical potential of the negative electrode vs. reference level and the positive electrode vs. reference level; and adjusting the amount of reversible ions in the electrochemical cell based upon the determined EAP from a previous electrochemical cell are repeated, as necessary until an amount of the reversible ions in the cell is identified that achieves the negative electrode potential verses reference level below a negative electrode damage threshold potential of the cell and the positive electrode potential verses reference level above a positive electrode damage threshold potential of the cell under the applied load at a near zero cell voltage state.

FIG. 1A shows an example of the electrode potentials in a lithium ion cell reaching the EAP once the cell as at a near zero volt state, in this case considered to be <10 mV cell voltage.

Figure 1B:
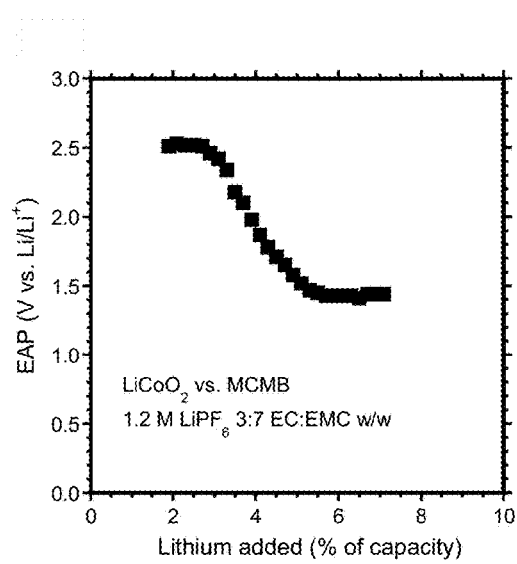
FIG. 1B is a graph of electrode asymptotic potential vs. excess lithium added to the cell.

FIG. 1B shows how the measured EAP can vary in a lithium ion cell based on the amount of reversible lithium ions added to the cell after cell conditioning. FIG. 1B is a plot of electrode asymptotic potential of a LiCoO$_2$/MCMB cell vs. the amount of excess lithium added to the cell as a percentage of cell capacity.

An amount of the reversible ions in the cell is identified that achieves the negative electrode potential verses reference level below a negative electrode damage threshold potential of the cell and the positive electrode potential verses reference level above a positive electrode damage threshold potential of the cell under an applied load to a near zero cell voltage state.

Figures 3A, 3B, 3C:
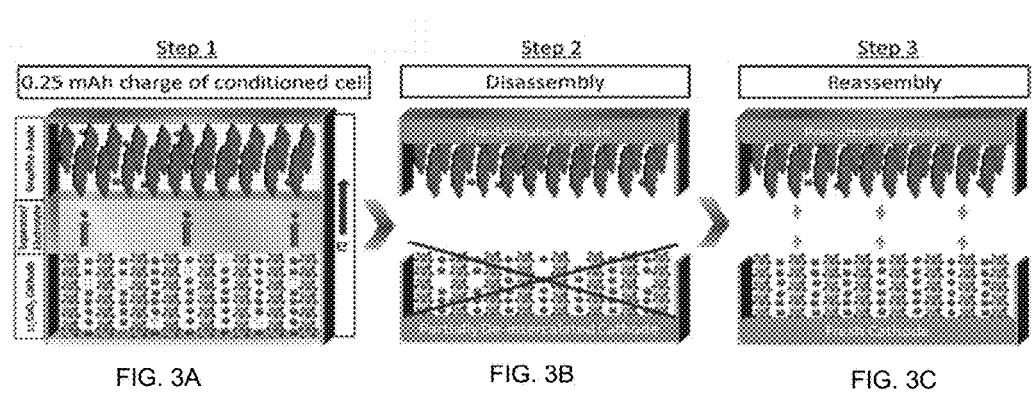
FIG. 3A is a schematic of a conditioned, discharged cell.
FIG. 3B is a schematic depicting disassembly of a cell.
FIG. 3C is a schematic of the reassembly in a new cell.

An electrochemical cell can be constructed that contains the identified amount of reversible ions. The amount of reversible ions can be managed via chemical, electrochemical or physical addition or subtraction. FIG. 3 shows how pre-lithiation of the negative electrode in a lithium ion cell can be used to appropriately change the amount of reversible lithium ions in the cell. FIG. 3A is a schematic of 0.25 mAh charge of a conditioned, discharged cell. FIG. 3B is a schematic depicting disassembly of cell and discarding positive electrode. FIG. 3C is a schematic of reassembly for a partially lithiated negative electrode with fresh positive electrode in a new cell.

Figure 2A:
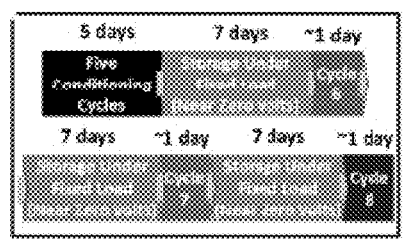
FIG. 2A is a chart showing a cycling schedule of a cell for near zero volt storage tolerance testing in accordance with the present disclosure.
Figure 2B:
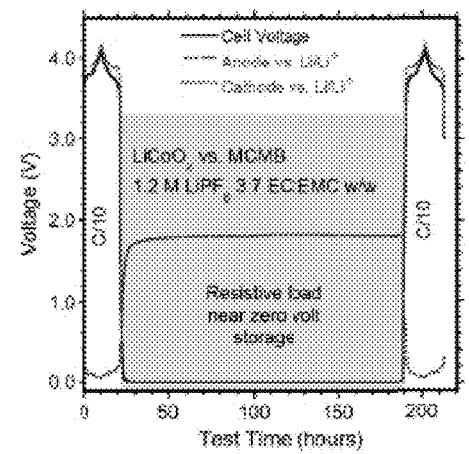
FIG. 2B is a graph of constant current discharge curves of a cell prior to and after various near zero volt storage periods.
Figure 2C:
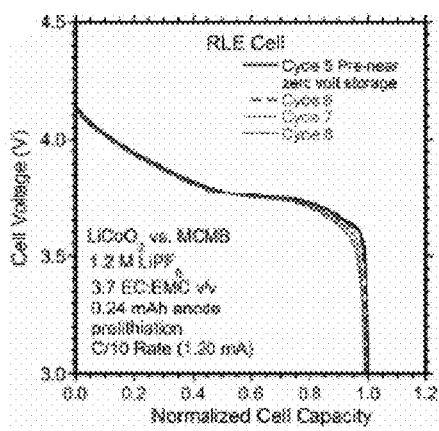
FIG. 2C is a graph of cell voltage over time for charge/discharge, storage, followed by recharge and charge/discharge.

FIG. 2C shows the cell voltage and electrochemical potentials of an as-constructed lithium ion cell during a fixed current charge and discharge followed by a near zero volt storage under a fixed resistive load step for 7-days, followed by a constant current charge and discharge. FIG. 2B is a plot of constant current discharge curves of the cell prior to and after the storage periods showing that the discharge performance of the cell is maintained well after 1, 2 and 3 seven-day near zero volt storage periods. FIG. 2A is an example of a cycling schedule of a cell with reversible lithium added by pre-lithiation for near zero volt storage tolerance testing.

A preferred embodiment is a lithium ion cell design which manages the amount of reversible lithium ions in the cell to enable a near zero voltage storage for prolonged periods of time under fixed load without significant degradation of either electrode. Cells are assembled with a positive electrode and a negative electrode that are configured to allow intercalation/alloying and de-intercalation/de-alloying of lithium ions. The positive electrode has an active material that includes an intercalating metal oxide or alloying material. The positive active material may be coated with electrochemically active or inactive stabilization coatings such as polymer, AlPO$_4$, ZnO or Al$_2$O$_3$ and can be mixed with conductive carbon allotropes and binder and can be free standing or coated on a conductive substrate, preferably aluminum. The negative electrode includes an active material that can include carbon allotropes, Ge, Si, Sn, Al or metal oxides. The negative active material can be coated with stabilization coating such as polymer, AlPO$_4$, ZnO or Al$_2$O$_3$ and can be mixed with conductive carbon allotropes and polymer binder and can be free standing or coated on a conductive substrate, preferably copper foil. The positive and negative electrodes are stacked or wound with a separator material between them that allows for diffusion of lithium ions. The electrode stack or wind is then hermetically sealed in a container with the appropriate electrical feed-through.

The amount of reversible lithium ions in the cell is changed via an electrochemical, chemical or physical addition/subtraction of reversible lithium. To achieve necessary precision, reversible lithium ions are preferably added from a third electrode during an open formation step in which the electrode stack or wind is immersed in electrolyte with a third electrode that acts as a lithium ion source or sink. Lithium can also be added via lithium addition or subtraction to either electrode prior to stacking or winding the positive and negative electrodes together. The extent of reversible lithium ion addition/subtraction can range from very little (e.g., 0.001% of cell capacity) to the suitable an amount to achieve maintenance of a negative electrode potential verses reference level below a negative electrode damage threshold potential and a positive electrode potential verses reference level above a positive electrode damage threshold potential of the cell under an applied load to a near zero cell voltage state, such that the cell is capable of recharge from the near zero cell voltage state (as informed by feedback reference electrode measurements).

A device includes an appropriate resistor which applies a suitable load during storage that could be fixed or variable and is selected based on the capacity of cell. A safety clip structure having for example, an analog voltmeter, is shown in FIG. 10A containing an appropriate resistor which can be used for the applied load during storage minimizes user risk during storage and handling. The safety clip structure can be fabricated with user controls for protection and disassembly. The load can be designed for low current dissipation (i.e., C/10) or in large battery systems a controlled/variable c-rate to manage heat transfer. A method could be followed which couples the resistor (or safety clip structure) to a properly designed heat transfer device (e.g., radiator, heatsink, etc.) which renders the battery system safe during an emergency. The safety clip structure could be designed so the cell or battery pack level has a heat transfer device manages the slow or rapid discharge to near zero volts, as shown in FIG. 10B.

During shipment of a battery pack, either standalone or that with electronic equipment (cell phone, hobby electronics, EV, etc.) the cells in a battery pack can have a resistor applied to them to completely discharge them to an effectively inert state. This will render them at negligible risk of going into thermal runaway, and thus they will be much safer to transport. Once the batteries arrive, the end-user can detach the resistor (or safety clip structure), charge the battery and use it without the battery having lost performance due to the near zero volt storage period.

During Satellite launch, cells could be held at a near zero volt state of charge for safety, then charged up once the satellite is deployed in orbit.

Cells stored long term (especially in large storage facilities with many batteries) can be stored with a resistor applied to them to hold them in a completely discharged, effectively inert state. This will again render them at negligible risk of entering thermal runaway and thus the storage will be much safer. When needed, the resistor can be removed and the cells cycled without loss of performance due to the zero volt storage period. In addition to safe transport and storage of lithium ion batteries, several other potential benefits exist for cells that can be discharged to and stored at a near zero volt state of charge.

The present disclosure as related to the preferred lithium ion cell embodiments differs from the prior lithium ion technology in that the amount of reversible lithium ions in a battery is managed such that near zero volt storage is possible without damaging the battery. No secondary active materials are necessary in either electrode and conventional current collectors (i.e., aluminum for the positive electrode and copper for the negative electrode) can be used rather than titanium, stainless steel or nickel. This will maintain battery performance at state of the art, not increase material costs and not complicate battery operation. Additionally, several embodiments of the cell have demonstrated their viability, both in general performance metrics and using reference electrode measurements to justify assertions about the electrode behavior during near zero volt storage.

The only widely available conventional technology for zero volt utilizes titanium current collectors which are inherently less conductive and more expensive than conventional copper current collectors. The dissolution of copper in a conventional cell design prevents its use in a zero volt resilient conventional cell, however, the present cell in accordance with the current disclosure overcomes that limitation through proper management of the amount reversible lithium ions in the cell so that copper current collectors can be used.

Embodiments of the present disclosure are matching or outperforming their conventional commercial counterparts. Previous conventional approaches to zero volt storage have taught the use of a "zero cross potential" (ZCP) at which the electrode potentials are predicted to meet when a cell is discharged to zero volts. The concept of the ZCP is an oversimplification of battery behavior and fails in many regards. The prediction of a ZCP is not straightforward and in prior art the methods used to predict it are vague or not described. Based on examination of prior art, the most probable way that the ZCP is predicted is by matching and extrapolating the discharge profiles of each electrode when they are cycled against a lithium metal counter electrode. The matching of the half-cell discharge profiles is likely arbitrary and based on a best-guess of the capacity matching of the electrodes.

Loss due to SEI formation, incomplete intercalation of the negative electrode (due to excess negative electrode used to prevent plating) and any other non-ideal effects that arise can be difficult to account for.

Additionally, in a practical zero volt storage situation where a fixed load is applied, the cell current decreases to very low levels (e.g., ~C/1,000-C/10,000 rate) when the cell voltage approaches zero volts. As a result, half-cell discharge profiles resulting from more typical, constant discharge rates (e.g., C/10, C/20) are not good predictors of the transient behavior of the electrode potentials or the EAP of the cell when the cell voltage (and cell current) approaches zero.

Additionally, ZCP can be discharge condition dependent—constant current, constant load, voltage ramp discharges may all result in a different ZCP. Once the cell reaches zero volts, if it is held there (by specialized equipment) the ZCP can migrate as cell current decreases.

In a practical near zero volt storage situation of a lithium ion cell, a fixed load is applied to the cell. In this scenario, the cell does not reach zero volts exactly and the electrode potentials do no "cross". Rather, the cell approaches very low voltages (1-10 mV) and the electrode potentials asymptote towards each other at a certain potential vs. reference level (typically Li/Li+).

Depending on the discharge condition, there may be transient behavior of the electrode potentials before they asymptote that can be very important to the performance retention of the cell. The ZCP teachings fail to predict this and only predict electrode potentials once the cell is a zero volts.

Figure 11:
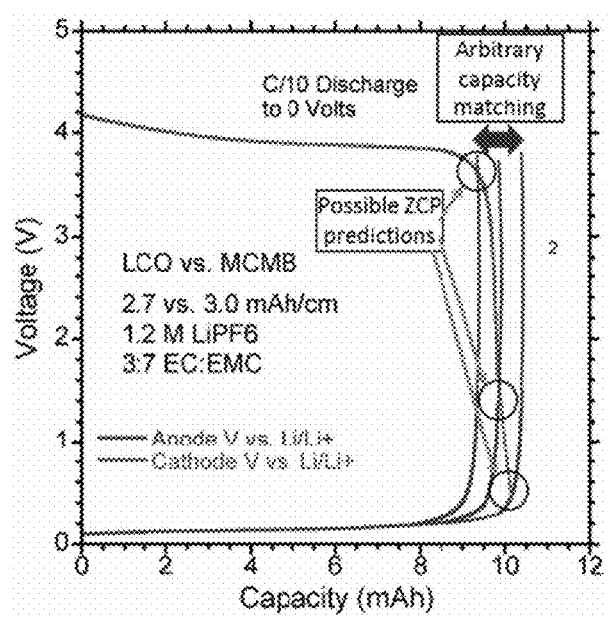
FIG. 11 is a graph of voltage vs. capacity indicating possible Zero Cross Potential points.

Based on previous teachings of use of a ZCP, there would be operational concerns with the presently disclosed approach when examined in concept. Addition of reversible lithium would likely cause the predicted negative electrode discharge curve to shift right, to a position like the rightmost negative electrode discharge curve as shown in FIG. 11. This would lead to a very low predicted ZCP (e.g., 0.5 V vs. Li/Li+). FIG. 11 illustrates how Zero Cross Potential may be arbitrarily predicted and the substantial variation that can occur. Such a low potential of the positive electrode predicted by the ZCP would be problematic for positive electrodes. A positive electrode material like $LiCoO_2$ will degrade if the potential vs. Li/Li+ decreases to less ~1.3 V vs. $Li/Li^+$ for an extended period. Other positive electrode materials, particularly metal oxides, might bear the same concerns.

However, we have shown in the present disclosure that by precisely managing the amount of reversible lithium ions in the cell, the negative electrode potential is kept below the negative electrode damage potential (copper dissolution potential) and the positive electrode potential is above the positive electrode damage potential. This is evidenced by the strong performance retention of the prototype $LiCoO_2$/MCMB cells after periods of zero volt storage shown in FIG. 2.

The precision of the negative electrode pre-lithiation is achieved by utilizing the data from proper reference electrode measurements, like those shown in FIGS. 1, 2, 4, 5, 7 and 8. Use of these measurements allows for precise determination of the minimal amount of reversible lithium that must be added to the cell to prevent the negative electrode potential from rising above the copper dissolution potential and minimizing over-discharge of the positive electrode.

This disclosure solves the issue of safety risks of lithium ion batteries during inactive storage and shipping by allowing them to be held in a completely discharged, effectively inert state without causing significant damage to the cell. This could support government initiative towards safer shipping. The approach used to achieve cells with zero volt storage tolerance does not use unconventional materials or atypical cell design. As such, cell quality does not have to be reduced from state-of-the-art to enable zero volt storage.

This general approach of managing reversible lithium can be applied to chemistries other than Li ion and to any future negative electrode/positive electrode materials.

FIG. 10 shows an example of how a resistor would be applied to the cell in a real life storage situation.

Since the current approach uses the conventional copper negative electrode current collector, and there are no other changes to the typical construction parameters of state of the art batteries, the rate capability and volumetric/gravimetric energy density will stay nominally the same as conventional. Addition or subtraction of reversible lithium in a cell may add to the battery cost, but the cost may be offset by reductions in shipping requirements or restrictions. The overall cost may not necessarily change but requires further analysis.

In an embodiment a lithium ion cell includes a positive electrode composite coated on an aluminum current collector that includes a polymer binder, carbon black conductive additive and $LiCoO_2$ active material; a negative electrode composite coated on a copper current collector that includes a polymer binder, carbon black conductive additive, graphite in the form of SFG-6 and graphite in the form of Meso Carbon Microbeads; a separator that is electrically insulating and allows for ion diffusion/migration/conduction; and electrolyte including 1.2 M $LiPF_6$ 3:7 EC:EMC v/v, wherein the negative electrode is cycled against a sacrificial positive electrode which forms the SEI and partially intercalates the negative electrode with active lithium, the amount of additional intercalation is ~2% of $Li^+$ ions based on cell capacity and is determined with reference electrode measurements to ensure that the electrode asymptotic potential of the cell is below the damage potential of the negative electrode and above the damage potential of the positive electrode. The negative electrode is built into the final cell with a fresh positive electrode, separator and electrolyte; the cell is then cycled repeatedly to complete formation; the cell is discharged normally, and has an applied fixed load of a designed amount applied to the cell to discharge it to and hold it at near zero volts cell voltage for multiple days; wherein the cell has a measured EAP of 1.9 V vs. $Li/Li^+$ and can be recharged and cells stored for 3 and 7 day periods at room temperature demonstrate >99% discharge capacity and discharge voltage retention; wherein the cell has a measured EAP of 1.9-2.0 V vs. $Li/Li^+$ and can be recharged and cells stored for 3 day periods at 45° C. demonstrate >97% capacity and discharge voltage retention.

In an embodiment the cell has $LiNi_{0.8}Co_{0.15}Al_{0.05}O_2$ as the active material in the positive electrode; a negative electrode pre-lithiation of ~2% of $Li^+$ ions based on cell capacity prior to cell assembly; a measured EAP of 2.6-2.7 V vs. Li/Li+ below the copper dissolution potential; and a capacity retention of ~100% after seven, 3 day near zero volt storage periods.

In an embodiment the cell has a lithium rich material of formula $0.49Li_2MnO_3 \cdot 0.51LiNi_{0.37}Co_{0.24}Mn_{0.39}O_2$ as the active material in the positive electrode; a measured EAP of 2.8 V vs. Li/Li+ at room temperature less than the negative electrode damage potential; which can be recharged and cells stored for five, 3 and 7 day periods at room temperature demonstrating >99% capacity and discharge voltage retention.

Examples

Figure 4A:
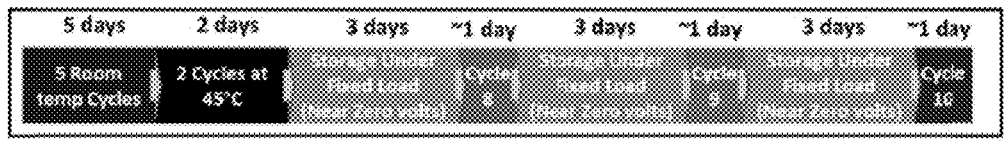
FIG. 4A is a chart showing a cycling schedule flow chart.
Figure 4B:
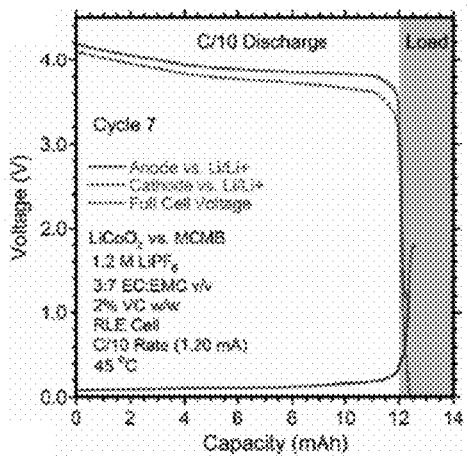
FIG. 4B is a graph of cell voltage vs. cell capacity of a RLE cell.
Figure 4C:
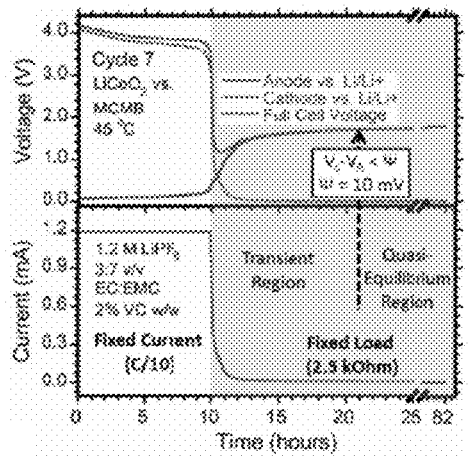
FIG. 4C is a graph of cell voltage vs. time of the RLE cell.
Figure 4D:
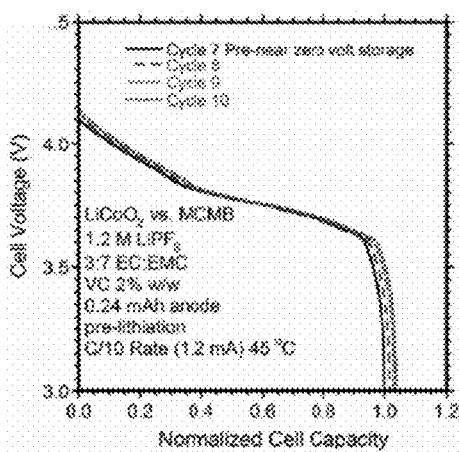
FIG. 4D is a graph of cell volt vs. normalized cell capacity.
Figure 4E:
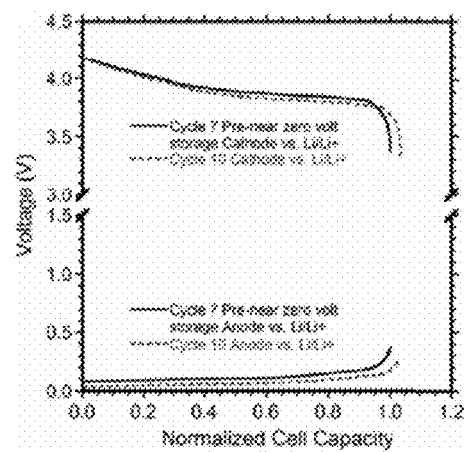
FIG. 4E is a graph of cell volt vs. normalized cell capacity.

Example 1 is directed to a 12 mAh lithium ion pouch cell that includes a positive electrode, negative electrode, separator and electrolyte. The electrolyte is 1.2 M LiPF 3:7 EC:EMC v/v. The positive electrode is a composite coated on an aluminum current collector that includes polymer binder, carbon conductive additive and $LiCoO_2$ active material. The negative electrode is a composite coated on a copper current collector that includes polymer binder, carbon black and graphite in the form of Meso Carbon Microbeads. The negative electrode is cycled against a sacrificial positive electrode which forms the solid electrolyte interface (SEI) and partially intercalates the negative electrode with active lithium. The amount of intercalation is precisely determined with reference electrode measurements to ensure that the EAP of the cell is less than the damage potential of the negative electrode and greater than the damage potential of the positive electrode. In this case, it is 0.8 mAh. The negative electrode is then built into the final cell with a fresh positive electrode, separator and electrolyte. The cell is then cycled repeatedly to complete formation. Then the cell can be discharged normally, and have a constant load of a designed amount applied to the cell to discharge it to and hold it at near zero volts cell voltage for multiple days. The cell can then be recharged and cells stored for 3 and 7 day periods at room temperature demonstrate ~100% capacity and discharge voltage retention. A cell (with 2% Vinylene Carbonate addition to the electrolyte for high temperature stability) stored under fixed load at near zero volts for 3 days at high temperature (45° C.) retained 97.6% of its original capacity and displayed only a 6 mV average discharge voltage fade. The cell of Example 1 was used to generate the information shown in FIGS. 1-4. FIG. 4A shows a cycling schedule flow chart summarizing room temperature conditioning, cycling at 45° C., and near zero volt storage testing at 45° C. FIG. 4B illustrates the 7th cycle discharge and fixed load step (grey shading) cell voltage and electrode potentials plotted vs. cell capacity of the RLE cell at 45° C. FIG. 4C illustrates the 7th cycle discharge and fixed load step (grey shading) cell voltage and electrode potentials plotted vs. time of the RLE cell. FIG. 4D shows the discharge profiles of the RLE cell prior to zero volt storage, and after one, two and three, three-day near zero volt storage periods at 45° C. FIG. 4E shows the discharge profile of the RLE cell electrode potentials as measured by a lithium metal reference prior to near zero volt storage, and after three, three-day near zero volt storage periods at 45° C.

Figure 5:
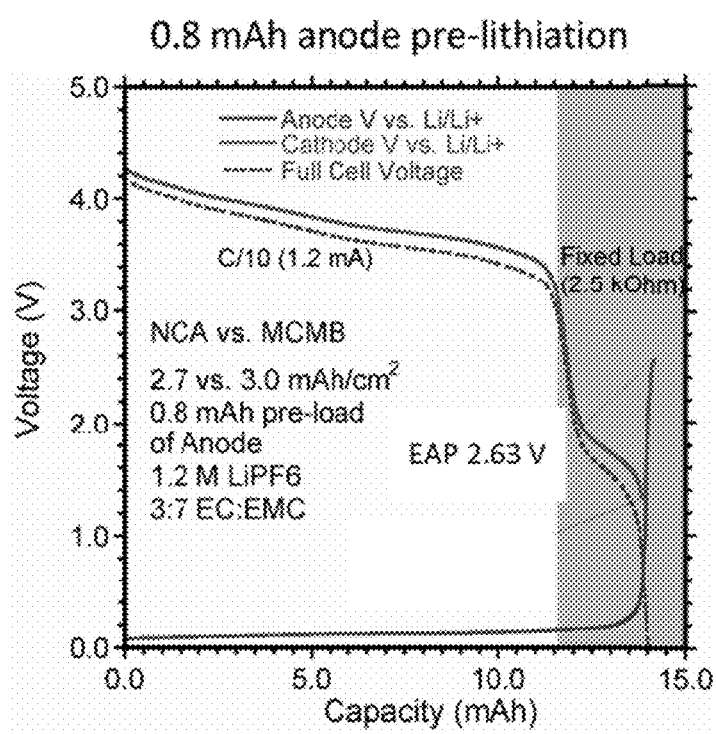
FIG. 5 is a graph of cell voltage vs. capacity.
Figure 6A:
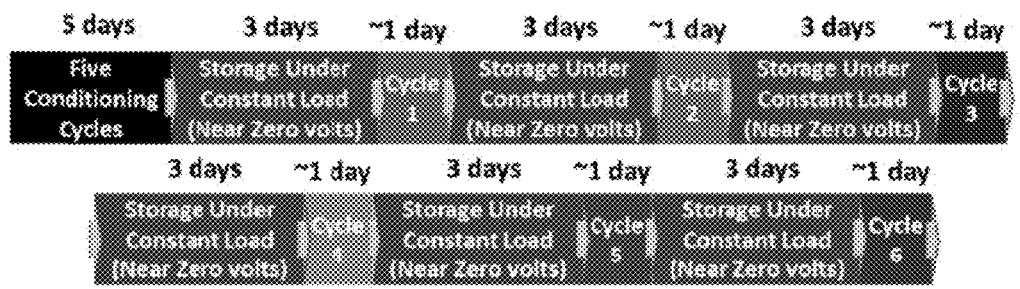
FIG. 6A is a chart showing a cycling schedule flow chart and FIG. 6B is a graph of cell volt vs. normalized cell capacity.
Figure 6B:
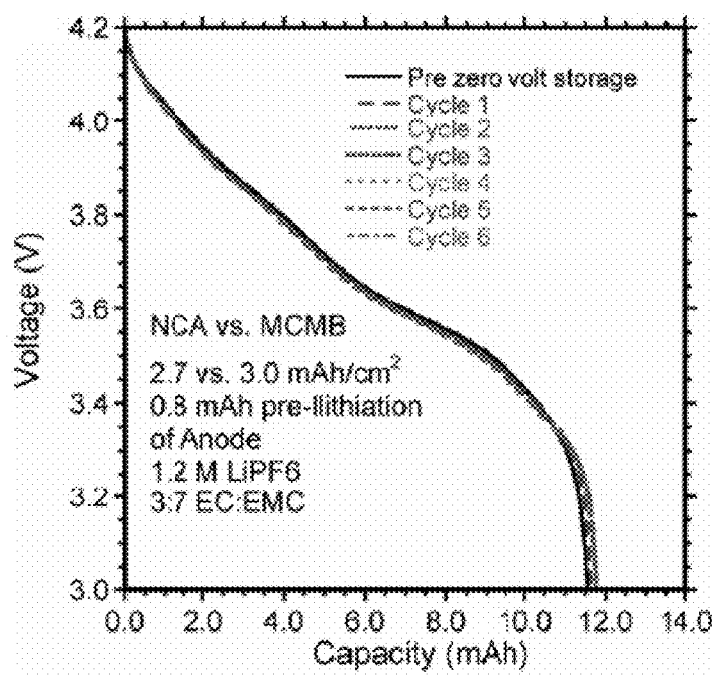

Example 2 uses the 12 mAh pouch cell lithium ion battery as in Example 1 with a $LiNiCoAlO_2$ positive electrode. Negative electrode pre-lithiation of 0.8 mAh prior to cell assembly, measured EAP of 2.6-2.7 V vs. Li/Li+, below copper dissolution potential of ~3.1 V vs. Li/Li+. Capacity retention of ~100% after six, 3 day zero volt storage periods under fixed load was obtained. FIG. 5 shows the cell voltage and electrode potentials of the $LiNiCoAlO_2$/MCMB cell after lithium is added to the cell by negative electrode pre-lithiation and the cell is conditioned. The white shaded portion is constant current discharge and the grey shaded region is a fixed load step. FIG. 6A shows the cycling schedule of the $LiNiCoAlO_2$/MCMB cell with reversible lithium added by pre-lithiation for near zero volt storage tolerance testing. FIG. 6B shows constant current discharge curves of the cell prior to and after 1, 2 and 3, three-day near zero volt storage periods.

Figure 7A:
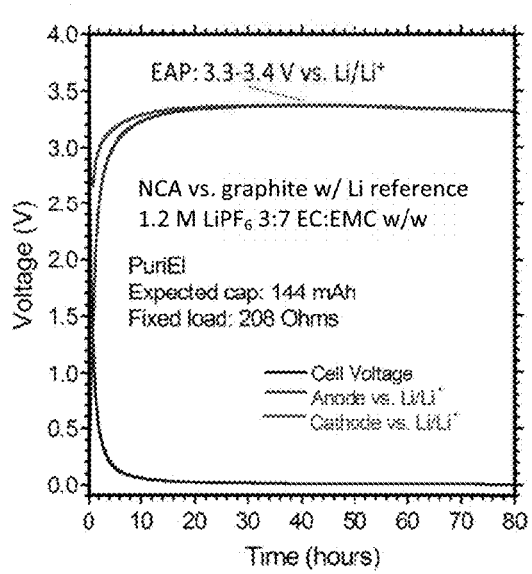
FIG. 7A is a graph of cell voltage over time and FIG. 7B is a graph of cell voltage over time of a cell with lithium added in bath formation process.
Figure 7B:
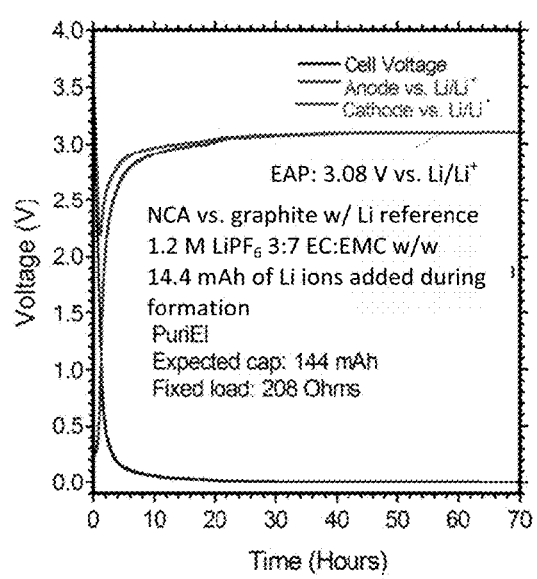

Example 3 uses a 144 mAh 8-pair pouch cell with a $LiNiCoAlO_2$ positive electrode. Lithium is added in a bath pre-lithiation process in an amount of 10% of cell capacity. FIG. 7A shows the cell voltage and electrode potentials of the $LiNiCoAlO_2$/MCMB cell under a fixed resistive load. FIG. 7B shows the cell voltage and electrode potentials of the $LiNiCoAlO_2$/MCMB cell with lithium added in a bath formation process under a fixed resistive load showing a lowered EAP compared to the baseline in FIG. 7A. An EAP of 3.1 V vs. $Li/Li^+$ was measured, which is less than the copper dissolution potential and therefore less than the negative electrode damage potential as shown in FIG. 4.

Figure 8:
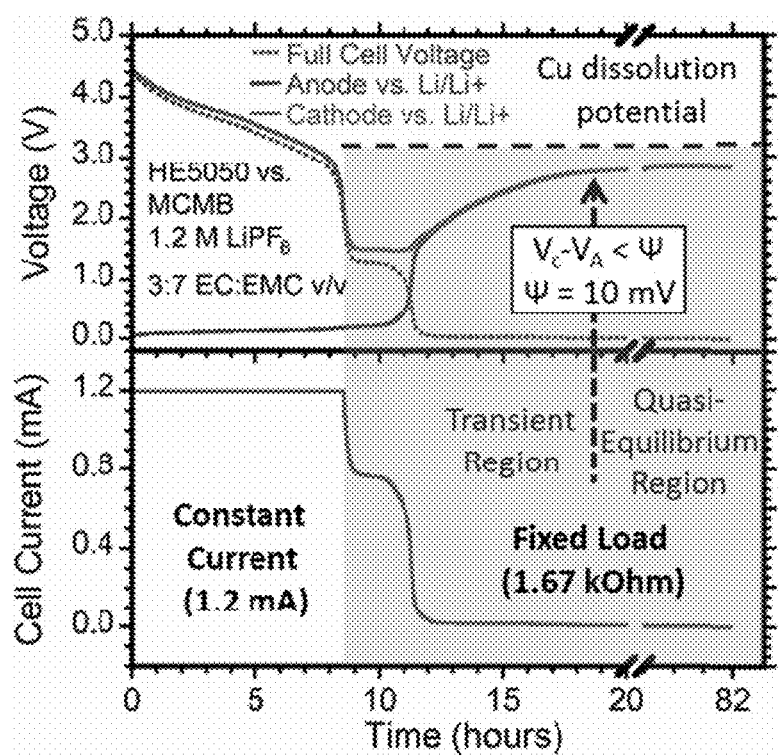
FIG. 8 is a graph of cycle discharge, fixed load step cell voltage and electrode potentials plotted vs. time of a RLE cell.
Figure 9A:
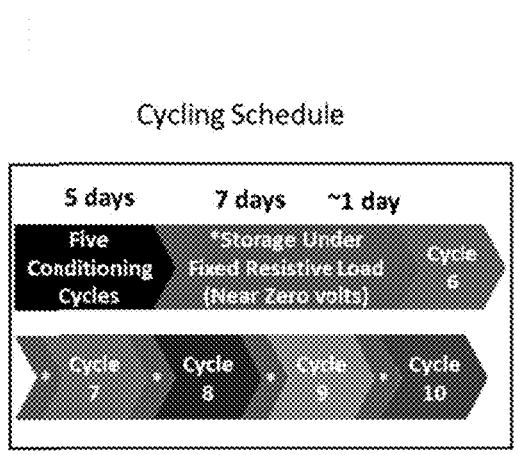
FIG. 9A is a chart showing a cycling schedule flow chart and FIG. 9B is a graph of cell volt vs. normalized cell capacity.
Figure 9B:
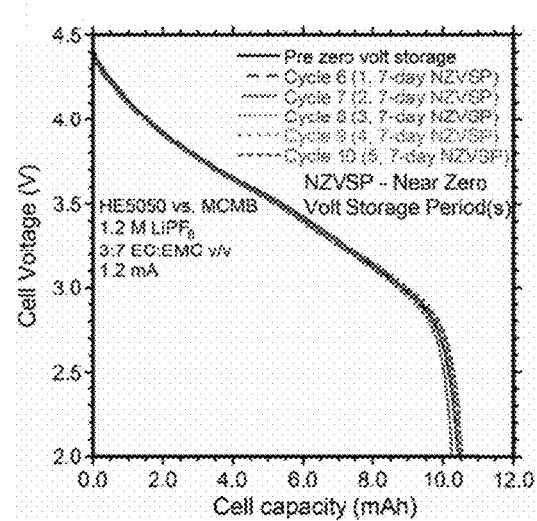

Example 4 uses the lithium ion cell of Example 3 with a lithium rich positive electrode material having the formula $0.49Li_2MnO_3 \cdot 0.51LiNi_{0.37}Co_{0.24}Mn_{0.39}O_2$, commonly known as HE5050. A measured EAP of 2.7 V vs. Li/Li+ at room temperature indicates the amount of reversible lithium is already appropriately managed by the charge/discharge behavior of the active electrode materials so that the EAP of the cell is less than the damage potential of the negative electrode and greater than the damage potential of the positive electrode. FIG. 8 shows the 5th cycle discharge and fixed load step (grey shading) cell voltage and electrode potentials plotted vs. time of the $0.49Li_2MnO_3 \cdot 0.51LiNi_{0.37}Co_{0.24}Mn_{0.39}O_2$ (HE5050)/MCMB cell. The dashed line represents the negative electrode potential threshold at which copper dissolution occurs. FIG. 9A shows the cycling schedule of the HE5050/MCMB cell for near zero volt storage tolerance testing. FIG. 9B shows the constant current discharge curves of the cell prior to and after 1, 2, 3, 4, and 5 seven-day near zero volt storage periods.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An electrochemical cell, comprising:
    a positive electrode;
    a negative electrode; and
    an electrolyte, wherein the electrochemical cell contains reversible ions in an amount sufficient to maintain a negative electrode potential verses reference level that is less than a damage potential of the negative electrode and a positive electrode potential verses reference level that is greater than a damage potential of the positive electrode of the cell under an applied load at a near zero cell voltage state, such that the cell is capable of recharge from the near zero cell voltage state.

2. The cell of claim 1, wherein the applied load is fixed or variable or a combination thereof.

3. The cell of claim 1, wherein the reversible ions comprise lithium, sodium, magnesium, aluminum, hydrogen, or a combination thereof.

4. The cell of claim 1, wherein the positive electrode comprises an active material and the negative electrode comprises an active material each electrode configured to allow intercalation/alloying/deposition and de-intercalation/de-alloying/stripping of the reversible ions.

5. The cell of claim 1, wherein the negative electrode comprises a carbon allotrope, Ge, Si, Al, metal oxide, titanate material or Sn as a secondary active material that has an intercalation/alloying and de-intercalation/de-alloying potential that is less than the damage potential of a positive electrode comprising active materials; and optionally ionated.

6. The cell of claim 1, wherein the cell is tolerant to near zero volt storage under an applied load over a range of temperatures from −100° C. to 200° C.

7. The cell of claim 1, further comprising a resistor comprising a suitable fixed or variable load applied to the electrodes based on the capacity of the cell to realize a near zero volt condition during storage.

8. The cell of claim 7, wherein the resistor comprises a safety clip structure that minimizes user risk during storage and handling, wherein the safety clip structure can be fabricated with user controls and readout device, display or transmitted signal which monitors cell voltage for protection and disassembly.

9. A battery comprising multiple electrochemical cells according to claim 1, which battery is capable of a near zero cell voltage state when the multiple electrochemical cells are under an applied load without significant performance degradation upon recharge.

10. A method for providing an electrochemical cell which manages an amount of reversible ions that enables a near zero voltage storage for prolonged periods of time under an applied load capable of recharge without significant degradation of discharge performance, comprising:
a) fabricating a first electrochemical cell having a negative electrode, a positive electrode, a third electrode, and an electrolyte;
b) measuring the voltage difference between the negative electrode and the third electrode to determine the electrochemical potential of the negative electrode verses reference level and measuring the voltage difference between the positive electrode and the third electrode to determine the electrochemical potential of the positive electrode verses reference level upon application of an applied load that electrically connects the positive electrode and negative electrode to the first electrochemical cell as the voltage difference between the positive electrode and the negative electrode of the first electrochemical cell voltage, reaches a near zero volts;
c) determining the electrode asymptotic potential from the measured electrochemical potential of the negative electrode verses reference level and the positive electrode verses reference level in the first electrochemical cell;
d) adjusting the amount of reversible ions in the first electrochemical cell based upon the determined electrode asymptotic potential from the first electrochemical cell, or fabricating a second electrochemical cell having a negative electrode, a positive electrode, a third electrode, and an electrolyte and adjusting the amount of reversible ions in the second electrochemical cell, based upon the determined electrode asymptotic potential from the first electrochemical cell; and
e) repeating steps a), b), c) and d) until an amount of the reversible ions in the cell is identified that achieves the negative electrode potential verses reference level below a negative electrode damage threshold potential of the cell and the positive electrode potential verses reference level above a positive electrode damage threshold potential of the cell under the applied load at a near zero cell voltage state, and optionally removing the third electrode.

11. The method of claim 10, wherein step a) is determined by measuring with a reference electrode the electrochemical potentials of the negative electrode and positive electrode as the electrochemical potentials asymptote towards each other during an applied load condition and asymptote towards an intermediate potential.

12. The method of claim 10, wherein determining the electrode asymptotic potential comprises constructing multiple cells with different amounts of reversible ions added or subtracted, or constructing a single cell wherein reversible ions can be added or subtracted in situ by electrochemical, physical or chemical means after measurement of the electrode potentials during the application of the applied load, the amount of reversible ions in the cell design is added or subtracted to change the electrode potentials during the applied load via feedback from measurements over a range of temperatures that can range from −100° C. to 200° C.

13. The method of claim 12, wherein the amount of reversible ions is adjusted in the cell via electrochemical, chemical or physical addition/subtraction of ions to the negative electrode, positive electrode or both.

14. The method of claim 10, wherein the reversible ion is lithium.

15. The method of claim 14, wherein reversible lithium ions are added by electrochemically inserting lithium ions into the negative electrode prior to cell assembly.

16. The method of claim 14, wherein reversible lithium ions are added or subtracted by immersing the electrodes in a bath of electrolyte and the reversible lithium is added or subtracted electrochemically to or from either the positive or negative electrode from the third electrode or a fourth electrode prior to final assembly of the cell.

17. The method of claim 14, wherein the reversible lithium ions are electrochemically added to or subtracted from the cell to either the positive or negative electrode from the third electrode or a fourth electrode that is removed from the cell after addition of the reversible lithium ions.

18. The method of claim 14, wherein the amount of reversible lithium ions is managed by the stoichiometry and charge/discharge performance of the active materials in the cell such that negative electrode potential verses reference level below a negative electrode damage threshold potential of the cell and the positive electrode potential verses reference level above a positive electrode damage threshold potential of the cell under the applied load to a near zero cell voltage state.

19. The method of claim 10, further comprising applying a load to the cell based on the capacity of the cell to realize a near zero volt condition during storage, wherein the load is designed for low current dissipation.

20. The method of claim 10, further comprising applying a load to the cell based on the capacity of the cell to realize a near zero volt condition during storage, wherein the load is designed for high current dissipation and the load is coupled to a heat transfer device.

* * * * *